Figure 1:
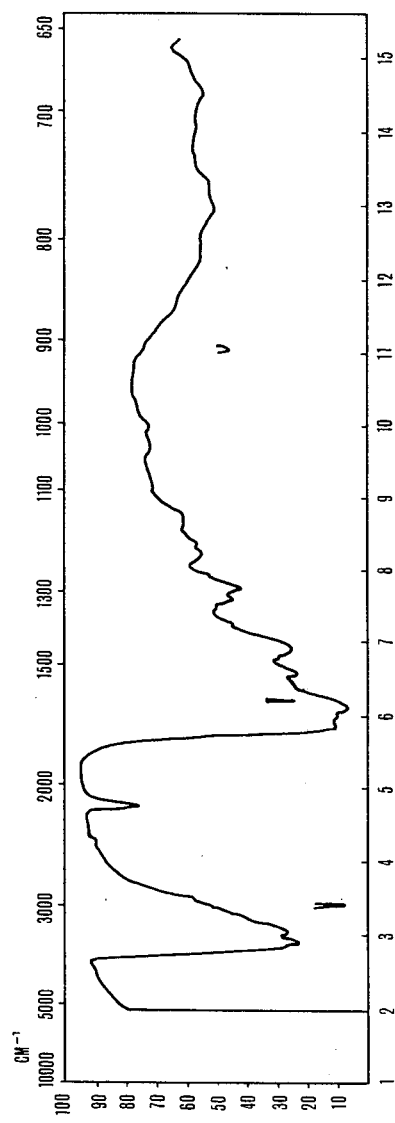
Figure 2:
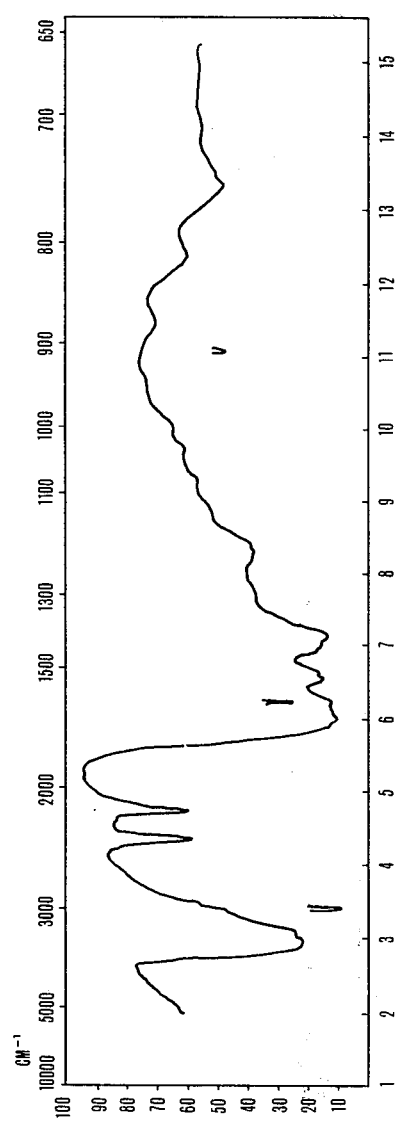

United States Patent [19]

Oda et al.

[11] 3,959,149

[45] May 25, 1976

[54] ISOCYANATE RESIN ABSORBENT FOR FREE CHLORINE, HEAVY METALS AND HEAVY METALLIC COMPOUNDS

[75] Inventors: Nakaaki Oda; Yoshio Horie; Mitsuru Idohara; Takeo Hukui, all of Takaoka, Japan

[73] Assignee: Nippon Soda Company Limited, Tokyo, Japan

[22] Filed: Aug. 25, 1971

[21] Appl. No.: 174,813

[30] Foreign Application Priority Data

| | | |
|---|---|---|
| Aug. 28, 1970 | Japan | 45-74958 |
| Sept. 21, 1970 | Japan | 45-82005 |
| Nov. 16, 1970 | Japan | 45-100201 |
| Dec. 29, 1970 | Japan | 45-121310 |
| July 14, 1971 | Japan | 46-51688 |
| June 12, 1971 | Japan | 46-41418 |
| Nov. 16, 1970 | Japan | 45-100202 |
| Dec. 29, 1970 | Japan | 45-121309 |

[52] U.S. Cl. ............ 260/77.5 R; 210/502; 210/38 R; 210/38 B; 260/2.5 AT; 260/2.2 R
[51] Int. Cl.² ............................................. B01J 1/08
[58] Field of Search ............... 260/2.5 AT, 77.5 AT, 260/2.2 R; 210/36, 38, 502, 24

[56] References Cited
UNITED STATES PATENTS

| | | | |
|---|---|---|---|
| 3,383,400 | 5/1968 | Meisert et al. | 260/2.5 AT |
| 3,422,165 | 1/1969 | Brotherton et al. | 260/2.5 AT |
| 3,674,828 | 7/1972 | Brooks et al. | 260/2.5 AT |
| 3,691,225 | 9/1972 | Kamal et al. | 260/77.5 AT |

*Primary Examiner*—Thomas G. Wyse
*Attorney, Agent, or Firm*—George B. Oujevolk

[57] ABSTRACT

As an absorbent for chlorine, heavy metals or heavy metallic compounds, a resin prepared by reacting polyisocyanate with at least one compound selected from the group consisting of polyols and functional monomers which have at least 2 active hydrogen atoms and at least one functional group selected from the group consisting of

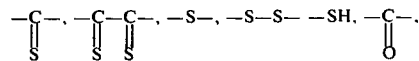

>NH and —N=, such that the ratio of the total active hydrogen atom number in the polyol and functional monomer to the total isocyanate group number in the polyisocyanate is 0.8 to 5.0.

1 Claim, 17 Drawing Figures

INVENTORS

BY

ATTORNEY

ISOCYANATE RESIN ABSORBENT FOR FREE CHLORINE, HEAVY METALS AND HEAVY METALLIC COMPOUNDS

DETAILED EXPLANATION OF THE INVENTION

This invention relates to a novel isocyanate resin adsorbent for free chlorine, heavy metals and heavy metallic compounds.

Ion-exchange resins and activated charcoal have been employed heretofore in capture or removal of heavy metals and heavy metallic compounds which are present or contaminate liquids or gases. However ion-exchange resins can capture ionic compound but not non-ionic compounds and moreover the resins hardly have selectivity of adsorbates. Further, activated charcoal can adsorbs both non-ionic and ionic compounds but the charcoal also has no selectivity of absorbates. Therefore, ion-exchange resins and activated charcoal are not suited for the capture or to remove free chlorine, heavy metals or heavy metallic compounds from liquids or gases which contain various kinds of materials. It has been thought to be difficult to capture or remove heavy metals or heavy metallic, compounds selectively, which exist in an amount of the order of ppm in liquids or gases with other compounds such as non-metallic compounds and light metallic compounds.

It is an object of this invention to provide an adsorbent which selectively absorbs free chlorine, heavy metals and heavy metallic compounds.

It is another object of this invention to provide a method to prepare an adsorbent which has a large adsorption capacity.

It is another object of the invention to provide an economical method to remove or capture free chlorine, heavy metals or heavy metallic compounds from liquid and gases for example service water, river water, drainage or sewage from a factory laboratory or hospital, air, exhaust gas from cars or factory, which are sometimes contaminated with free chlorine, heavy metals and heavy metallic compounds.

It is also another object of the invention to provide an economical method to prevent surroundings from pollution by heavy metals or heavy metallic compounds.

It is yet another object of the invention to provide a method to make waste, which contains heavy metals or heavy metallic compounds, harmless and insoluble and to prevent heavy metals or heavy metallic compounds from causing damage.

Other objects of this invention will become apparent from the following detailed description, when taken together with the accompanying drawings in which: FIGS. 1 through 17 graphically illustrate a recorder output.

It has been discovered that isocyanate resins, which are prepared by reacting polyisocyanates with one or two compounds selected from the group consisting of polyol compounds and a functional monomer, selectively adsorbs free chlorine, and heavy metals, such as Cr, Mn, Cd, Co, Ni, Cu, Hg, Pb, metallic ions and heavy metallic compounds. A functional monomer can be defined as a compound having at least 2 active hydrogen atoms to react with the isocyanate group and at least 1 functional group selected from the group consisting of

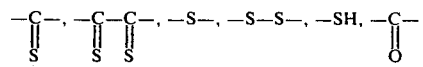

and $>$ NH,

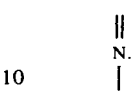

Active hydrogen atom may be combined in the functional monomer as a radical of $H_2N-$, $HS-$,

(wherein R is an alkyl radical) $HO_3S-$, $HOOC-$, $HON=$, $H_2NCO-$,

$H_2NO_2S-$ and $HO-$ and some preferable examples of functional monomers are thiourea, rubeanic acid, tetramethylene-bis-dithiocarbamate, diaminothiophenyl, diaminodiphenyldisulfide, diaminobiphenyl, diphenylthiourea, diphenyl guanidine, diphenylcarbazide, di(p-nitrophenyl)carbazide, thioacetamide methionine, cysteine, 4-aminothiophenol, phenylhydantoic acid, benzoilthiourea, dimercarptophenyldiamine, anilinedisulfonic acid, chromoteopic acid, nitroso R acid, citric acid, aminoterephtharic acid, cysteine, dimethylglyoxime, metasulfoamideaniline, orthosulfonamide, hydrogensulfide, ammonium polysulfide, nicotinamide, benzoylurea, benzoylaminacetoamide, nitrobenzensulfonamide, pyrogallol, salicyaladoxime, catecholdisulfonic acid, chlomotropic acid, glyoxal bis(2-hydroxyphenyl), thioglycollic acid, aminopyridine, pyridinedicarboxylic acid, piridinedicarboamide, dithioglycollic acid, dithioglycollic amide, bis(4-aminothio)phenyl, diaminochloroanilic acid, dithiodiglycollic acid, β-thiodiglycol, thidiglycollic acid, thioglicollic acid amide, thiosemicarbazide urea, benzoilthiourea.

Polyisocyanates having 2 or more isocyanate groups in the (isocyanate group includes thioisocyanate) for example, aromatic polyisocyanates e.g. toluylenediisocyanate (TDI), dimer or trimer of TDI, diphenylmethandiisocyanate (MDI), TDI or MDI tar, which is obtained as a residue by distillation of TDI or MDI (crude) or by removal of amines from TDI or MDI by means of pyrolysis, dimethyldiphenylmethandiisocyanate, naphthylenediisocyanate, aliphatic polyisocyanates e.g. hexamethylenediisocyanate, lysinediisocyanatemethyl ester etc, can be employed in this invention.

Silver, mercury, silver compounds and mercuric compounds are especially adsorbed by the resin particularly when the functional monomer has the radial

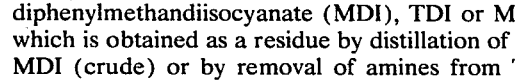

for example, thiourea, dithiooxamide, diphenylthiourea, tetramethylenebisdithiocarbamate dithioglycollic acid 2,3'-diaminodiphenylsulfide 3,3'-diaminodiphenyldisulfide, urea, diphenylcarbazide, diphenylurea, dithiodiglycolic acid, thioglycolic acid, methionine, diaminoprydine 2,5'-dimencaptophenylenediamine, and

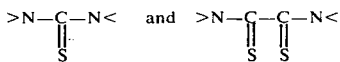

can be preferably employed. The inventive concept can be used, even if silver compounds and mercuric compounds are nonionic or ionic compounds e.g. metallic oxides e.g. HgO, $Ag^2O$, metallic chlorides e.g. $HgCl_2$, $Hg_2Cl_2$, AgCl, metallic complex compounds e.g. $Na_2Hg_2Cl_4$, metallic salts e.g. $HgSO_4$, $Hg(NO_3)_2$, $Ag_2SO_4$, $HgCO_3$, $Ag_2CO_3$, $Hg_2SO_4$, HgS, $Hg_2S$, $Hg_2(NO_3)_2$, organometallic compound e.g. methylmercury chloride, ethylmercury chloride, phenylmercuric acetate, ethylmercury iodide, methylmercury iodide, ethylmercury bromide, methylmercury fromide, phenylmercury chloride, diphenylmercury, phenylmercury benzoate.

Further, cadmium, copper, cadmium compounds and copper compounds are especially adsorbed by the resin when the functional monomer having

for example, dithiooxamide, is used, even if such metallic compounds are nonionic or ionic, for example, $CdSO_4$, $CdCl_2$, CdS, CdO, $Cd(OH)_2$, $CCH_3(OO)_2Cd$, $CuSO_4$, CuCl, $Cu(OH)_2$, CuS, CuO, $Cu_2S$, $(CH_3COO)_4Cu_2$.

Furthermore lead and lead compounds are especially adsorbed by the resin when the functional monomer having —S—S— group for example, dithiodiglycolic acid, dithiodiglycol amide, bis(4-aminothiophenil), is used as a raw material of the resin, even if lead compounds are nonionic or ionic.

As for polyol in this invention, various kinds of diol, triol or polyol can be employed, for example, polyether polyols inclusing diol and triol e.g. polyethylene glycol, polypropylene glycol, polyether triol (glyceline), polyester polyols including condensate between organic acids and glycols e.g. condensate between adipic acid diethylene glycol and trimethylol propan.

When polyisocynatates are reacted with polyol compounds and a functional monomer, the polyol should be less than 1.5 mole ratio to 1 mole of functional monomer in order to expect the effect of the functional groups.

In accordance with this invention, the resin can be prepared by reacting polyisocyanates with polyol and-/or the functional monomer by mixing at 0°C to 200°C preferably at 25°C to 160°C with or without a solvent. A solvent having no activity to the reactants, for example, ketones e.g. acetone, methylethylketone, methylisobutylketone, can be employed. A ratio of polyol and/or functional monomer to isocyanates used in the reaction is preferably controled so that the ration of the total active hydrogen atoms used in the reaction to the isocyanate group is about 0.8 to 5. The feeding ratio differs depending upon the number of isocyanate group in the polyisocyanate molecule used and the number of active hydrogen of the functional monomer. When diisocyanates and a functional monomer having 2 active hydrogen atoms are used, the ratio of mole number of the functional monomer to the mole number of the diisocyanate is be about 0.8 to 1.2 and preferably 0.9 to 101 and when a diisocyanate and a functional monomer having 4 active hydrogen atoms are employed, the ratio of the mole number of the functional monomer to the mole number of the diisocyanate may be about 0.4 to 1.2, preferably 0.5 to 1.2. If the isocyanate group exists excessively in the reaction mixture or in the resin obtained without any need, agent which reacts to the isocyanate group, for example, water, mercaptan e.g. methyl mercaptan, ethyl mercaptan monoalcohol, and methanol, ethanol can be added so as to terminate the reaction.

Additives such as a surfactant, foaming agent, coloarant etc. can be employed, if desired in the reaction.

The resin can be used in several forms to suit the need, for example, into the shape of foam, foamed plastics, granules or powder etc.

Various means can be employed in order to enlarge the surface area ($m^2/g$) of the resin and to heighten the capacity of adsorption. One way is to grind or divide the resin into fine powder and another is to foam the resin having open cells in a polymerization step.

The means employed depend on the properties of the resin and the means may be sometimes very troublesome particularly when the resin is tough and the formed resin has closed cells (foams).

One of the best means to heighten the capacity of adsorption is to use a carrier which holds the resin in impregnated state or in states covering surfaces of the carrier.

The resin with the carrier can be preferably prepared by the following method.

Isocyanates, polyols and/or the functional monomers are respectively or simultaneously impregnated into the carrier and isocyanates and polyol and/or the functional monomer made to coexist in the carrier and then the polymerization reaction is completed in the carrier. When isocyanates, polyols, the functional monomers and mixture of isocyanate - polyols, isocyanate-polyols-the functional monomer, or isocyanate-the functional monomer has not sufficient fluidity to impregnate into the carrier, an appropriate solvent may be employed and preferably, ketones e.g. acetone, methylethylketone, methyl isobutyl ketone and tetrahydrofran can be used.

If desired, the mixture may be polymerized a little to form a prepolymer in the solution prior to the impregnation, however the polymerization should not be carried on to the extent that a large amount of turbidity appears in the solution.

The impregnation should be carried out in order to contain resin at a desired amount of 0.1% to 100% preferably 5% to 45% by weight to carrier weight and for this purpose, the solution of the mixture is preferably prepared in concentrations from 0.1% to 50% by weight. Ordinary methods, for example, dipping and spraying are used for the impregnation. In order to facilitate the impregnation, if desired the, carrier may be dried, heated or air in the carrier may be removed for reduced pressure. After the impregnation, if necessary, excess amounts of isocyanate, polyol and/or the functional monomer and mixture thereof which exist on the surfaces of the carrier may be rinsed with solvent or may be centrifuged.

The polymerization can be completed by heating, after the removal of solvent used or by heating combining removal of the solvent, at high temperatures preferably at 50°C to 150°C for more than about 30 minutes preferably 2 hours to 20 hours so as to digest the polymerization.

As for the carrier, many kinds of materials having a porous structure and wide surfaces can be employed and preferably porous materials having large specific surfaces more than 1m²/g (BET's method by argon gas), for example, diatom earth, pumice stone, zeolite, kaolin, vermiculite, alumina (aluminum oxide), silica gel, coke, activated charcoal, graphite, bentonite, foamed urethane resin having open cell, are used as a carrier and if inorganic carrier is used, the carrier being preferably about 20mm to 0.05mm in diameter are employed.

The resin in the carrier is presented in the state following the fine porous structure of the carrier and has large specific surfaces to an extent more than 1.0²/g. The specific surfaces of the carrier may be reduced and the reduction of the surfaces sometimes goes up to 70% to 85% of un-treated carrier, but gives no trouble in this invention.

When this isocyanate resin adsorbent is used, various conventional method for adsorption can be employed, for example, the resin adsorbent is contacted with liquids or gases to be treated in a batchwise operation, packed tower or layer system fluid bed operation etc. and, in a packed tower or layer system, liquids are ordinary passed through at a rate of 2 to 30 of SV(space velocity) preferably 5 to 15 of SV and gases are ordinary passed at 2 to 25m/min preferably 5 to 15m/min.

The resin adsorbent in our invention can be activated by dipping in pure water for several days or by treating with an acid solution having a concentration of less than 2N preferably less than 1N, for example, aqueous solution of mineral acid e.g. hydrochlorio acid, sulfuric acid, nitric acid, sulfurous acid, can be used for dipping and preferably rinsed with water to the extent that the water used for rinsing has pH about 4 preferably 6 to 7.

The resin absorbent can selectively absorb free chlorine, heavy metal and heavy metallic compounds from liquids or gasses to the extent of under detectable concentrations of 0.01 to 0.001 ppm and the adsorbing ability last long and further the capacity is large to the extend that the resin an absorb 3 to 35% by weight for the resin.

The resin adsorbent can be used for various purposes using the characteristic properties. For example, the adsorbent is used for removal of free chlorine, heavy metals and heavy metallic compounds and capture or recovery of heavy metals, and fixation of heavy metal and heavy metallic compounds.

The resins in this invention have some novel usages besides the conventional usages as an adsorbent. For example, when a slurry or granular wastage containing heavy metals or heavy metallic compounds is sometimes treated to be packed in a concrete box in order to dump at sea or to bury in the ground, heavy metals or heavy metallic compounds pass out through the walls of the concrete box by extraction with water and then pollute the surroundings. In that case mixing resin and the wastage at a ratio of 0.1 to 50% of the resin in the wastage completely prevents the passing out of harmful heavy metal and heavy metallic compounds and further when the resin is homogeniously mixed in concrete or motor in an amount of 0.1% to 50% preferably 1 to 20% for cement, which is used in the concrete or motor, the resin checks and prevents heavy metals and heavy metallic compounds from passing through the cement or mortar walls. Moreover solidifying material, which solidifys, for example, cement e.g. Portland cement, alumina cement, Portland blast, furnace cement, soilica cement, or raw material of resin, containing 0.1% to 50% preferably 1% to 20% of the resin adsorbent can be used for packing of harmful heavy metal components and further, walls or constructions made by such solidifying material prevents heavy metals and heavy metallic compounds from passing through the walls or the constructions such as pipes for drainage.

EXAMPLE 1

38 parts of powder thiourea were gradually added into 87 parts of TDI-80 at 100°C with vigorous stirring. The mixture became creamy, and gradually turned yellow, and temperature rose to 110°C and then solidified resinous material was obtained.

A content of —NCO group in the obtained material was about 10% and infrared spectrum absorption (IR spectrum) of it is shown in FIG. 1.

EXAMPLE 2

Toluylenediamine and phosgene were reacted with a solvent of o-dichlorobenzene and $N_2$ gas was bubbled into reaction mixture in order to remove phosgene and hydrochloric acid and TDI tar containing 25% of —NCO group was obtained as a residue by distilation of TDI under a reduced pressure of 10 mmHg.

25 parts of the obtained TDI tar was ground, melted at 160°C, and reacted with vigorous stirring with 12.7 parts of thiourea which was equivalent weight for the -NCO group content in the TDI tar. The mixture gradually turned to a solidifed resinous material and 8 parts of O-dichlorobenzene were added to enable stirring and reaction was continued for 1 hour and after 2 hour of digestion of the reaction in drying chamber at 160°C dark (black-brown) resinous foamy material containing free —NCO group was obtained. The IR spectrum was shown in FIG. 2.

EXAMPLE 3–21

Example 1 or 2 was repeated for the following isocyanates and functional monomer.

Isocyanates, functional monomer, reaction condition etc were listed in Table 1

Table 1

Figure 3:
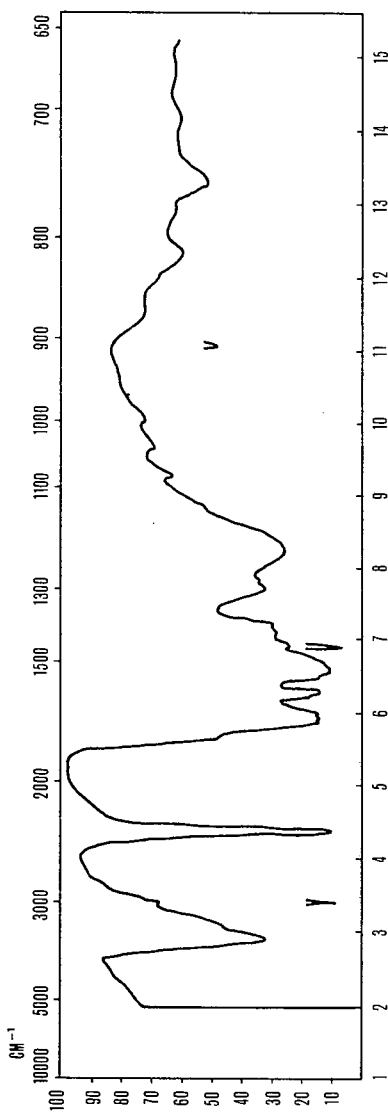
Figure 4:
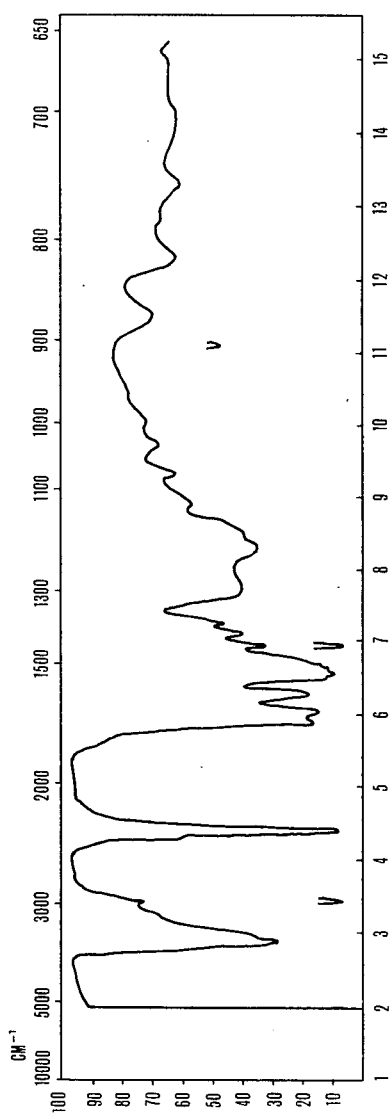

| Ex. | isocyanates | (parts) | functional monomers | (parts) | reaction condition temp.(°C) | corresponding to example | resinous material appearance | IR-chart |
|---|---|---|---|---|---|---|---|---|
| 3 | TDIT | 103 | thiourea | 38 | 100–120 | 1 | yellow | |
| 4 | TDIT | 103 | rubeanic acid | 60 | 140–160 | 1 | red-brown | |
| 5 | TDI-80 | 174 | rubeanic acid | 60 | 130–150 | 1 | red-brown | FIG. 3 |
| 6 | TDI-80 | 174 | dithiodiglycollicacid | 91 | 100–120 | 1 | yellow | FIG. 4 |
| 7 | TDI-80 | 174 | ammonium dithiocarbamate | 120 | 70–100 | 1 | yellow brown | |
| 8 | TDI-80 | 87 | tetramethylene-bis-dithiocarbamate | 120 | 80–100 | 1 | yellow brown | |

Table 1-continued

Figure 5:
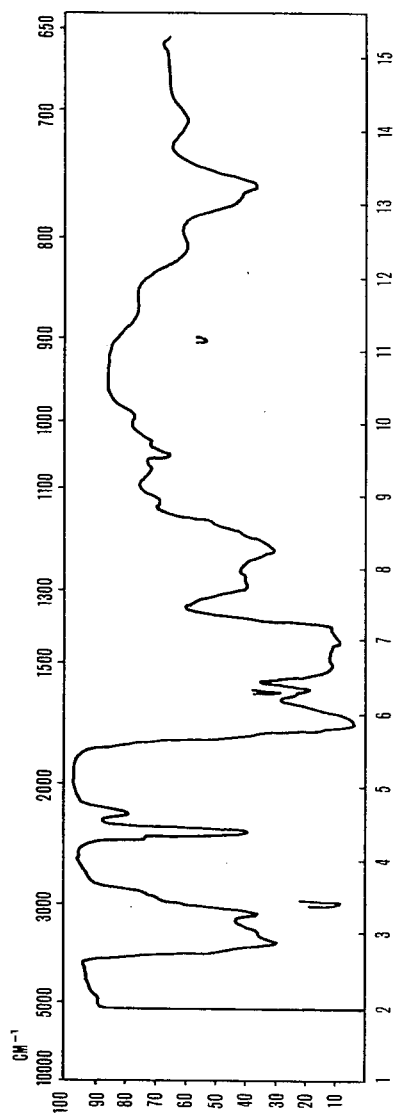
Figure 6:
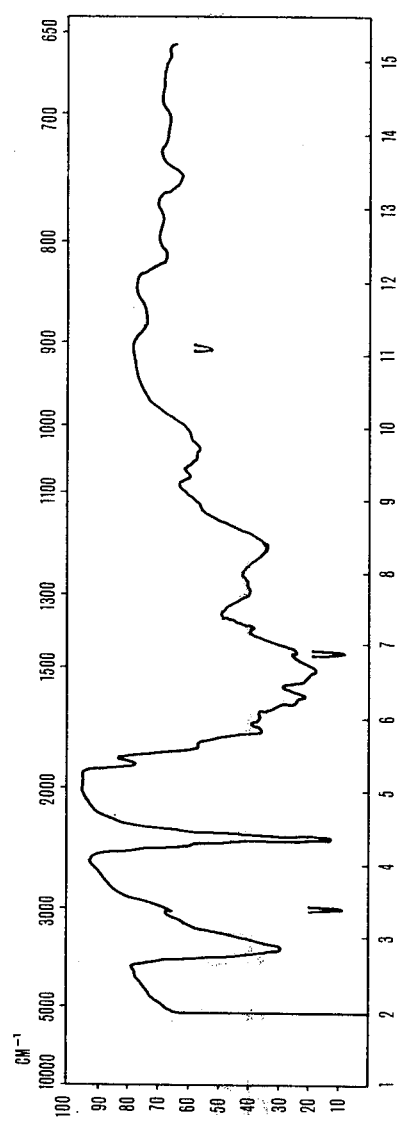

| Ex. | isocyanates | (parts) | functional monomers | (parts) | reaction condition temp.(°C) corresponding to example | resinous material appearance | IR-chart |
|---|---|---|---|---|---|---|---|
| 9 | TDI tar | 87 | diphenylthiourea | 114 | 140–160 / 2 | black (foamy) | |
| 10 | TDI 80 | 174 | urea | 30 | 80–100 / 1 | pale yellow (foamy) | FIG. 5 |
| 11 | TDI tar | 100 | urea | 18 | 140–160 / 2 | black (foamy) | |
| 12 | MDI | 125 | thiourea | 38 | 80–100 / 1 | pale yellow (foamy) | |
| 13 | MDI (crude) | 140 | thiourea | 38 | 100–120 / 2 | black (foamy) | |
| 14 | TDI dimer | 87 | thiourea | 19 | 120–140 / 2 | brown | |
| 15 | TDI trimer | 87 | thiourea | 13 | –150 / 2 | brown | |
| 16 | NDI | 105 | thiourea | 38 | 120–140 / 2 | brown (foamy) | |
| 17 | TODI | 132 | thiourea | 38 | 100–120 / 2 | brown (foamy) | |
| 18 | MPDI | 80 | thiourea | 38 | 70–90 / 2 | yellow (foamy) | |
| 19 | HMDI | 84 | thiourea | 38 | 100–120 / 2 | pale yellow | |
| 20 | LDI | 106 | thioglycollic acid | 91 | 100–120 / 2 | pale yellow | |
| 21 | TDI-80 | 87 | chloranilic acid | 52 | 100–120 / 2 | black-violet | FIG. 6 |

TDIT: toluylenediisocyanate
MDI: diphenylmethandiisocyanate
TODI: toluidinediisocyanate
NDI: naphthalenediisocyanate
HMDI: hexamathylenediisocyanate
PDI: phenylenediisocyanate
LDI: lysine diisocyanate
MDI (crude): undistillated MDI

EXAMPLE 22

8.7 parts of TDI-80 and 1.6 parts of thiourea were gradually mixed and 10.5 parts of polyethyleneglycol-400 was added dropwise under vigorous stirring. The reaction mixture generated heat, became viscous and the temperature rose slowly to 80°C. Then 2 parts of water was added as a foaming agent under vigorous stir. When the mixture became sticky and generated foams, stir was stopped and the mixture was digested in drying chember at 80°–100°C for 3 hours.

Figure 7:
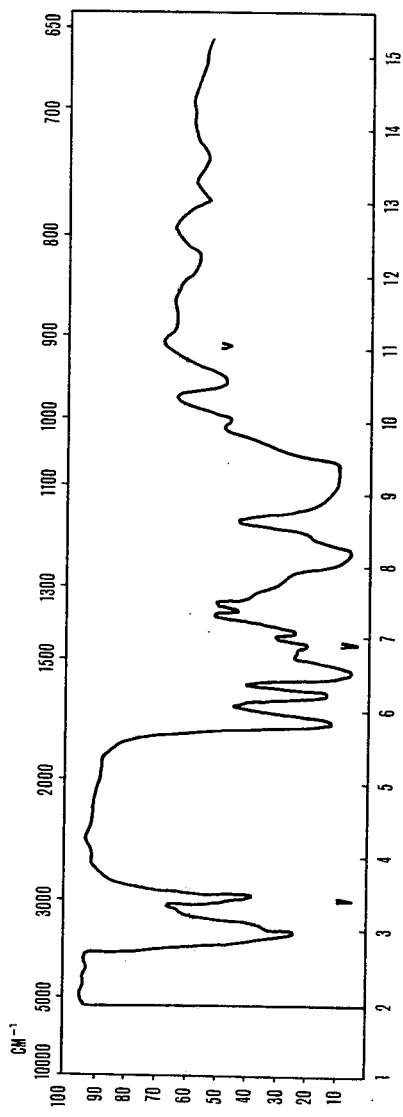
Figure 8:
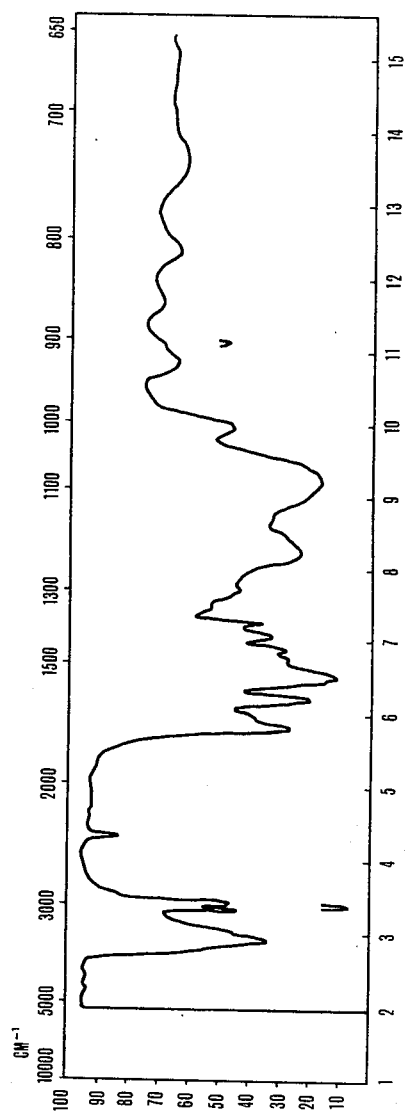

IR chart of the obtained flexible foam was shown in FIG. 7.

EXAMPLE 23

76 parts of TG-3000 (polyethertriols), 20 parts of thiourea, SH-190 (silicon compound; foam controller), 0.3 part of T-9 (organotin compound; catalyst for foaming agents) were mixed at 20°C for 1 minutes and then 100 parts of TDI 80 was added, mixed with vigorous stir at 20°C for 7–10 seconds. The mixture generated foams and the foamed substance was allowed to stand for 24 hours at room temperature and further cured at 120°C for 3 hours. IR spectrum of the obtained yellow flexible foam was shown in FIG. 8.

EXAMPLE 24

Figure 9:
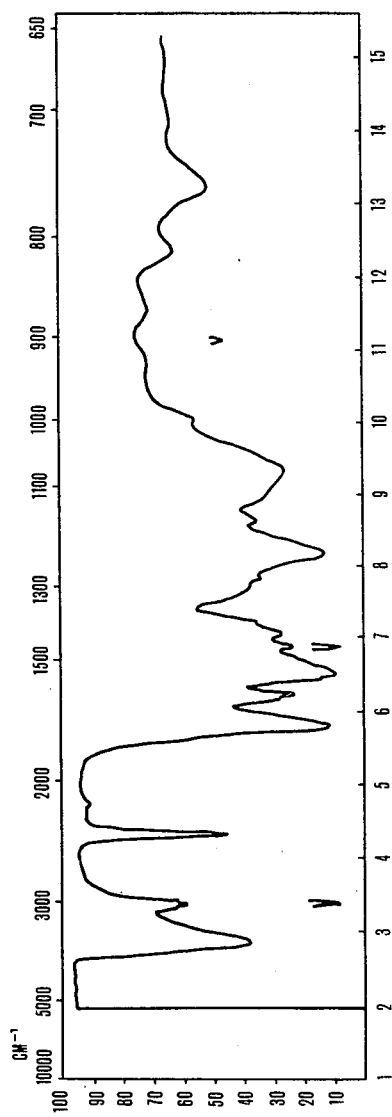
Figure 10:
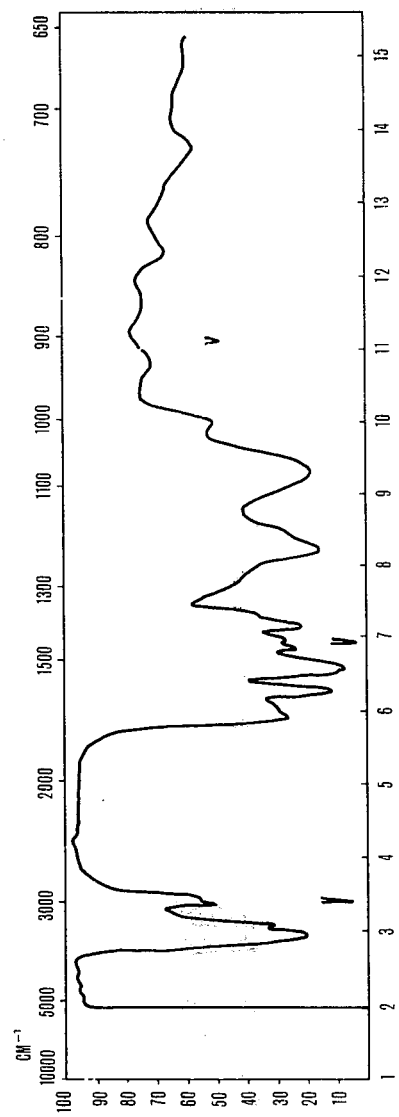
Figure 11:
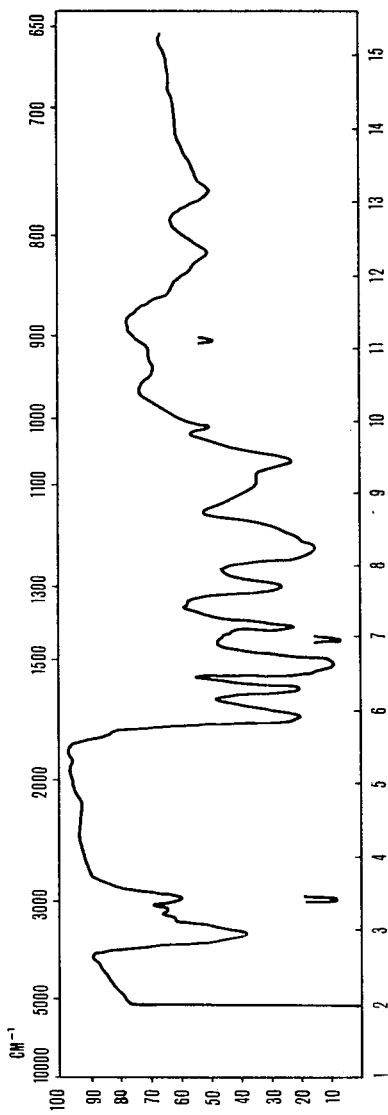
Figure 12:
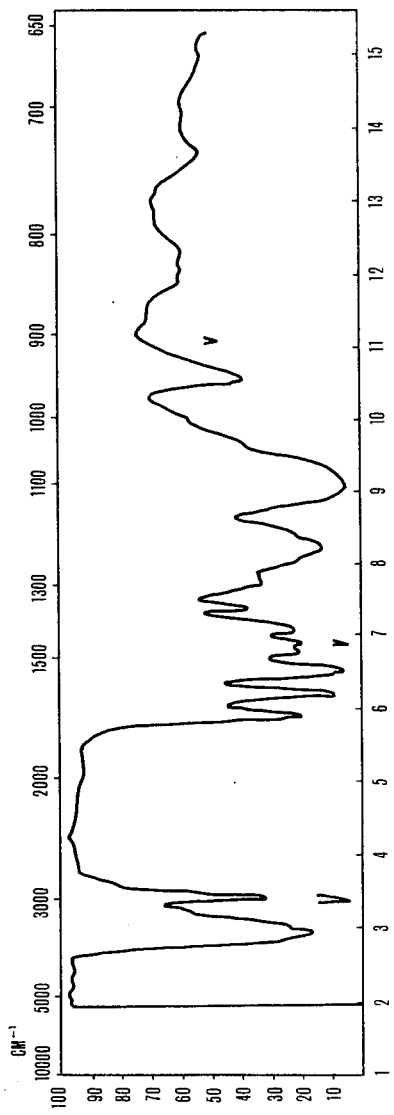
Figure 13:
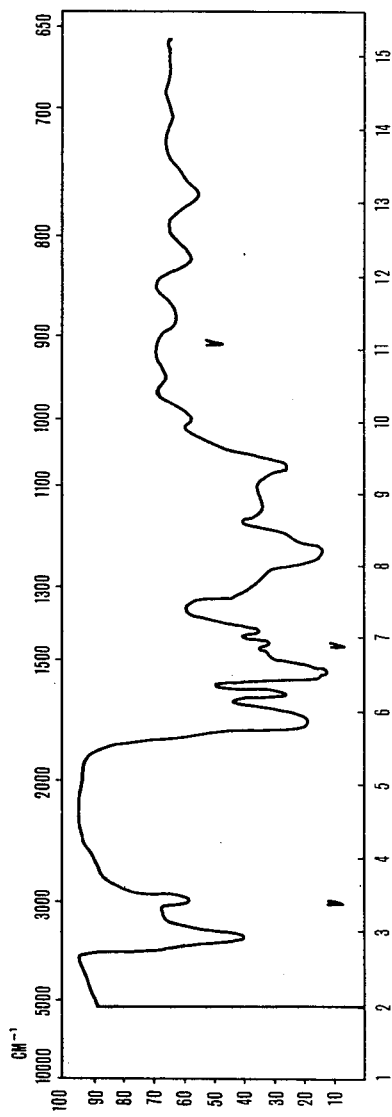
Figure 14:
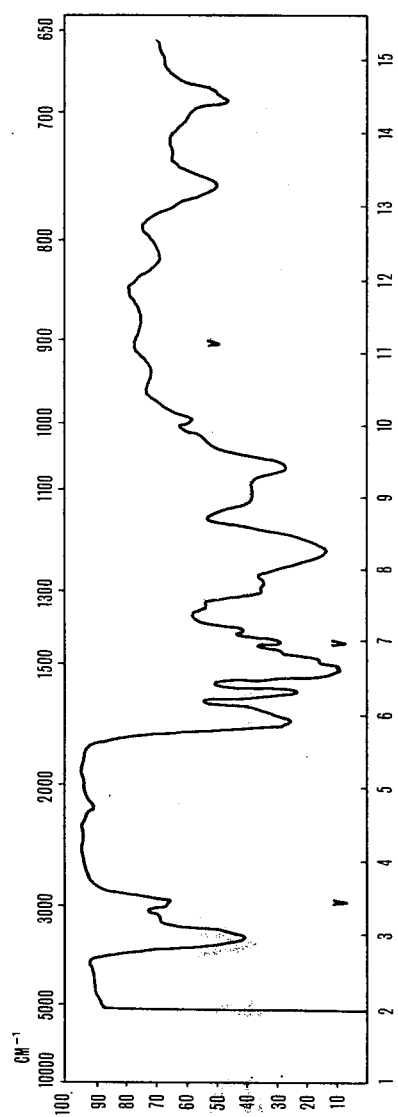
Figure 15:
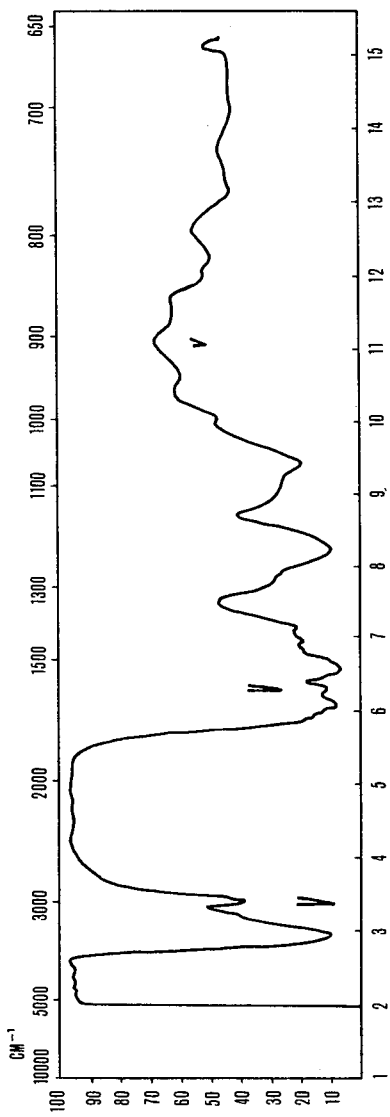
Figure 16:
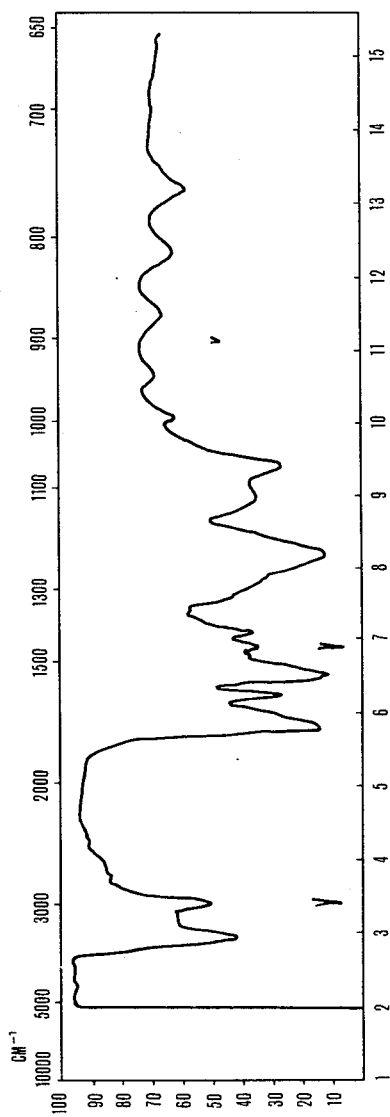
Figure 17:
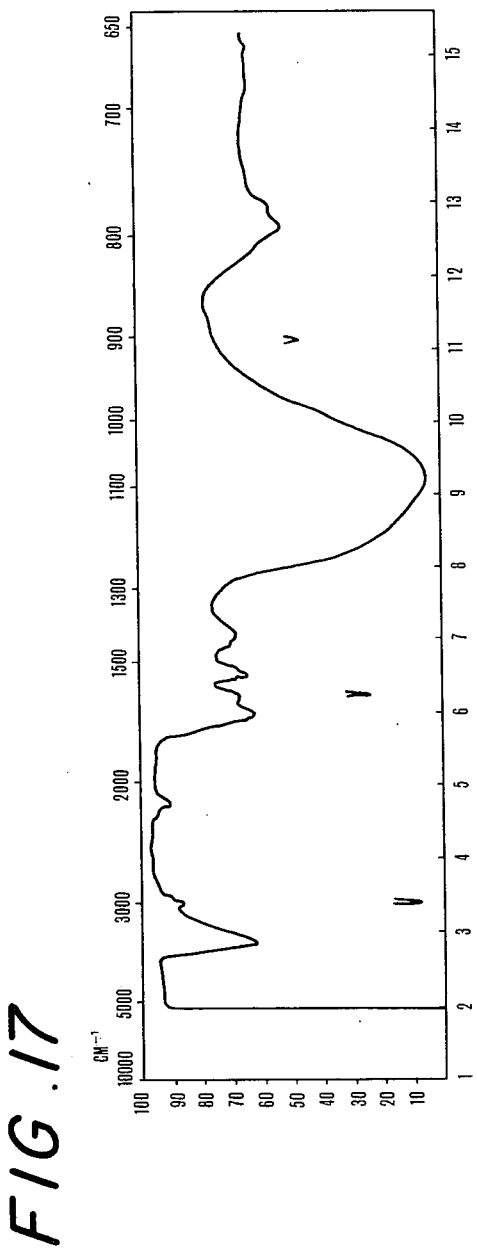

560 parts of TDI-80 and 100 parts of TG-300 were mixed at 100°C for 20 minutes and prepolymer containing 30% of —NCO group was obtained. On the other hand, 100 parts of TG-300, 2.0 parts of SH-190, 0.3 parts of T-12, 0.1 parts of Dabco, 3.4 parts of water and 63 parts of thiourea were mixed for 1 minute with vigorous stir at 30°C and then 400 parts of above mentioned prepolymer was mixed at 20°C and the mixture was stirred for 2–5 minutes and generated foams. The foaming material was allowed to stand at room temperature for 24 hours and then cured at 130°C for 3 hours. The obtained yellow foam showed IR spectrum as shown in FIG. 9.

EXAMPLES 25–43

Example 22 was repeated by using other isocyanates, polyols and functional monomer.

The isocyanate, polyols and functional compounds and etc. were listed in Table 2.

Table 2

| EX. | isocyanates | (parts) | functional monomers | (parts) | polyols | (parts) | reaction condition reaction temp. (°C) | resinous material appearance | IR-chart |
|---|---|---|---|---|---|---|---|---|---|
| 25 | TDI-80 | 8.7 | thiourea | 1.6 | PPG-500 | 8.7 | 80 | white (foamy) | FIG. 10 |
| 26 | MDI(crude) | 14.3 | thiourea | 1.6 | PEG-200 | 5.2 | 80 | brown (foamy) | FIG. 11 |
| 27 | TDI-80 | 11.9 | thiourea | 2.8 | PEG-4000 | 17.4 | 100 | white | FIG. 12 |
| 28 | TDI-80 | 10.7 | thioglycollicacid | 2.1 | PEG-200 | 5.3 | 80 | pale yellow | FIG. 13 |
| 29 | TDI-80 | 10.7 | diphenylthiourea | 5.2 | PEG-200 | 5.3 | 80 | pale brown (foamy) | FIG. 14 |
| 30 | TDI-80 | 9.2 | rubeanic acid | 2.1 | PEG-200 | 4.4 | 100 | orange (foamy) | FIG. 15 |
| 31 | TDI-80 | 35 | dithiodiglycollicacid | 18 | PEG-400 | 40 | 80 | pale yellow (foamy) | FIG. 16 |
| 32 | TDI-80 | 35 | ammoniumdithio-carbamate | 12 | PPG-200 | 20 | 80 | yellow (foamy) | |
| 33 | TDI-80 | 35 | tetramethylene-dithiocarbamate | 24 | PEG-200 | 20 | 100 | yellow brown (foamy) | |
| 34 | TDIT | 41 | thiourea | 7.5 | PEG-200 | 20 | 80 | pale yellow (foamy) | |
| 35 | TDIT | 41 | rubeanic acid | 12 | PPG-200 | 20 | 100 | red-orange (foamy) | |
| 36 | TDIT | 41 | ammoniumdithio-carbamate | 12 | PEG-400 | 40 | 80 | yellow (foamy) | |
| 37 | TDI(crude) | 10.6 | thiourea | 1.6 | PEG-200 | 8.7 | 80 | brown (foamy) | |
| 38 | TDItrimer | 52 | thiourea | 6 | PPG-200 | 10 | 120 | yellow (foamy) | |
| 39 | NDI | 42 | dithiodiglycollicacid | 18 | HS-700*1 | 70 | 80 | pale yellow (foamy) | |
| 40 | TODI | 26.5 | glycollic acid | 4.6 | PEG-400 | 20 | λ | pale yellow (foamy) | |
| 41 | PDI | 32 | thiourea | 7.5 | PPG-200 | 20 | 80 | white (foamy) | |
| 42 | HMDI | 34 | thiosemicarbazide | 9 | ODX-105*2 | 40 | 100 | pale yellow (foamy) | |

Table 2-continued

| EX. | isocyanates | (parts) | functional monomers | (parts) | polyols | (parts) | reaction condition reaction temp. (°C) | resinous material appearance | IR-chart |
|---|---|---|---|---|---|---|---|---|---|
| 43 | LDI | 43 | urea | 6 | ODX-105*² | 40 | 100 | white (foamy) | |

*¹HS-700 sorbitol-polyetherpolyol
*²ODX-105 adipic acid-glycol-polyester polyol

EXAMPLE 44

230 parts of TDI tar, which was obtained in Example 2, 50 parts of thiourea and 1800 parts of methylethylketone were mixed well and the mixture was gradually heated to dissolve completely.

1400 parts of diatom earth having 1—2mm in diameter were added into the mixture and then methylethylketone was slowly distiled off under reduced pressure. The obtained diatom earth containing TDI and thiourea were heated at 140°C–160°C for 2 hours. The finished diatom earth contained 14% of resinous material.

EXAMPLE 45

8 part of thiourea was dissolved in 600 parts of methylethylketone and the obtained solution was cooled as for as thiourea did not isolate and then 20 parts of polypropylene glycol (PPG-200) was gradually added and dissolved in the solution.

400 parts of well dried diatom earth having 1–2mm in diameter were soaked in the solution, methylethylketone was slowly distiled off, and the diatom earth was heated at 80°C–100°C for 3 hours. The finished diatom earth contained 15% of resinous material.

EXAMPLE 46

40 parts polyethylene glycol (PEG-400) were dissolved in 700 part of acetone and 500 parts of diatom earth having 1–2mm in diameter were soaked in the solution, and then acetone was slowly distilled off.

On the other hand 8 parts of thiourea was dissolved in 700 parts of methylethyl ketone by heating and 42 parts of TDI (crude) was added in the solution under stir and heated at 60°C–70°C for 15 minutes and cooled to room temperature, and then foresaid diatom earth containing PEG-400 was soaked in the solution and methylethylketone was distilled off. The obtained diatom earth was heated at 80°C–100°C for 3 hours and the finished diatom earth contained 15% of resinous material.

EXAMPLES 47–69.

Example 44, 45 or 46 was repeated for isocyanates functional monomer and polyol listed in Table 3, reaction condition and content of resinous material etc were shown in Table 3.

Table 3

| COL. 1 Example | COL. 2 isocyanates | parts | COL. 3 functional monomer | parts | COL. 4 polyol | parts | COL. 5 carrier | parts |
|---|---|---|---|---|---|---|---|---|
| 47 | TDIT | 103 | thiourea | 38 | not used | | diatom earth | 500 |
| 48 | TDIT | 103 | rubeanic acid | 60 | not used | | diatom earth | 600 |
| 49 | TDI-80 | 87 | rubeanic acid | 60 | not used | | diatom earth | 600 |
| 50 | TDI-80 | 87 | dithiodiglycollic-acid | 91 | not used | | diatom earth | 720 |
| 51 | TDI-80 | 87 | ammoniumdithio-carbamate | 120 | not used | | diatom earth | 800 |
| 52 | TDI-80 | 174 | thiourea | 76 | not used | | diatom earth | 1200 |
| 53 | TDI tar | 87 | diphenyl thiourea | 114 | not used | | diatom earth | 800 |
| 54 | TDI-80 | 87 | urea | 30 | not used | | diatom earth | 500 |
| 55 | TDI tar | 100 | urea | 18 | not used | | zeolite | 500 |
| 56 | MDI | 125 | thiourea | 38 | not used | | zeolite | 600 |
| 57 | MDI | 140 | thiourea | 38 | not used | | alumina | 600 |
| 58 | TDI dimer | 87 | thiourea | 19 | not used | | zeolite | 500 |
| 59 | TDI trimer | 87 | thiourea | 13 | not used | | zeolite | 500 |
| 60 | NDI | 105 | thiourea | 38 | not used | | diatom earth | 600 |
| 61 | TODI | 132 | thiourea | 38 | not used | | diatom earth | 700 |
| 62 | PDI | 80 | thiourea | 38 | not used | | diatom earth | 400 |
| 63 | HMDI | 84 | thiourea | 38 | not used | | kaolin | 600 |
| 64 | LDI | 106 | dithioglycollic-acid | 91 | not used | | silica-gel | 800 |
| 65 | MDI | 100 | thiourea | 16 | PEG-200 | 40 | diatom earth | 800 |
| 66 | TDI-80 | 35 | rubeanicacid | 12 | PPG-200 | 20 | diatom earth | 400 |
| 67 | TDI-80 | 35 | ammonium-dithiocarbanate | 12 | PPG-200 | 20 | diatom earth | 400 |
| 68 | TDIT | 41 | thiourea | 8 | PEG-400 | 40 | zeolite | 400 |
| 69 | TDI(crude) | 42 | dithioglycollic-acid | 18 | HS-700 | 70 | alumina | 700 |

Table 3-continued

| Example | COL. 6 solvent | parts | COL. 7 reaction condition temp.(°C) | corresponding to example | COL. 8 finished adsorbent content of resinous material in carrier | granular |
|---|---|---|---|---|---|---|
| 47 | MEK | 900 | 80 → 160 | 44 | 22 | pale brown |
| 48 | MEK | 1000 | 80 → 160 | '' | 21 | brown |
| 49 | MEK | 1000 | 80 → 150 | '' | 19 | brown |
| 50 | MEK | 1400 | 80 → 120 | '' | 19 | pale brown |
| 51 | MEK | 1200 | 80 → 140 | '' | 20 | yellow brown |
| 52 | MEK | 1800 | 80 → 150 | '' | 17 | brown |
| 53 | MEK | 1200 | 80 → 150 | '' | 20 | pale yellow |
| 54 | MEK | 1000 | 80 → 160 | '' | 19 | white |
| 55 | acetone | 600 | 60 → 160 | '' | 19 | black brown |
| 56 | acetone | 800 | 60 → 170 | '' | 21 | pale yellow |
| 57 | MEK | 600 | 80 → 170 | '' | 22 | black brown |
| 58 | MEK | 600 | 80 → 150 | '' | 17 | pale yellow |
| 59 | MEK | 500 | 80 → 160 | '' | 13 | pale yellow |
| 60 | MEK | 1400 | 80 → 160 | '' | 19 | yellow |
| 61 | MEK | 1100 | 80 → 160 | '' | 19 | pale brown |
| 62 | MEK | 700 | 80 → 140 | '' | 23 | pale brown |
| 63 | MEK | 1200 | 80 → 140 | '' | 16 | dark yellow |
| 64 | acetone | 1000 | 60 → 140 | '' | 19 | pale yellow |
| 65 | MEK | 1000 | 80 → 100 | 45 | 16 | brown |
| 66 | MEK | 600 | 80 → 120 | '' | 14 | brown |
| 67 | acetone | 600 | 60 → 100 | '' | 14 | yellow brown |
| 68 | MEK | 600 | 80 → 100 | '' | 22 | pale yellow brown |
| 69 | acetone MEK | 1000 | 60 → 100 | 46 | 18 | black brown |

TDIT: toluylene diisocyanate
MDI: diphenylmethandiisocyanate
TODI: toluidinediisocyanate
NDI: naphthalenediisocyanate
HMDI: hexamethylenediisocyanate
PDI: phenylendiisocyanate
LDIM: lysinediisocyanate MEK: methylethylketone

EXAMPLE 70 (A)

30 grs. of resinous adsorbent obtained in example 22 were ground to 14–32 mesh (Tyler), dipped in 1N-HCl aqueous solution for 24 hours and rinsed with water to the extent of pH=6 of rinsing water. Obtained resinous adsorbent was packed in glass tube having 15mm diameter. 10 liters of aqueous solution containing $HgCl_2$ at a concentration of 10 ppm corresponding to Hg were passed at pH 6 through the glass tube at a rate of SV=5 and the content of $HgCl_2$ in the treated aqueous solution was measured and less than 0.01 ppm of $HgCl_2$ content was found.

B. Example 70 (A) was repeated except that aqueous solution containing Hg, Pb, Cd, Ni, Mn, Cr, B, Co, Cu, As and Al respectively at a concentration of 20 ppm corresponding to each metal was passed in the tube at pH 4.

Contents of these metals in the treated aqueous solution were mesured by emission spectroanalysis and it was found that content of Hg under detection sensivity (0.001 ppm) and contents of other metallic compounds of Pb, Cd, Ni, Mn, Cr, B, Co, Cu, As and Al were 17–20 ppm and consequently the resinous adsorbent had a selectivity for mercury compounds.

EXAMPLES 71–111

Example 70 (A) was repeated except that resinous adsorbent, concentration of HCl solution and SV were changed.

Resinous adsorbent and results of the treatments etc were shown in Table 4.

Table 4

| Example | resinous adsorbent | concentration of HCl aqueous solution | SV | mercury content in treated aqueous solution (ppm) |
|---|---|---|---|---|
| 71 | obtained in example 8 | 1NHCl | 5 | 0.01 |
| 72 | '' 9 | '' | '' | 0.03 |
| 73 | '' | 10 | N/10 HCl | 3 | less than 0.01 |
| 74 | '' | 11 | '' | '' | '' |
| 75 | '' | 12 | '' | 5 | '' |
| 76 | '' | 13 | N/4 HCl | '' | '' |
| 77 | '' | 14 | '' | '' | '' |
| 78 | '' | 15 | '' | '' | '' |
| 79 | '' | 16 | '' | '' | 0.02 |
| 80 | '' | 17 | '' | 3 | 0.01 |
| 81 | '' | 18 | '' | 5 | less than 0.01 |
| 82 | '' | 19 | '' | '' | 0.02 |
| 83 | '' | 20 | '' | '' | 0.05 |
| 84 | '' | 21 | '' | 3 | 0.02 |
| 85 | '' | 26 | 1N-HCl | '' | 0.01 |
| 86 | '' | 27 | '' | 5 | 0.03 |
| 87 | '' | 28 | '' | '' | 0.03 |
| 88 | '' | 29 | '' | '' | 0.03 |
| 89 | '' | 37 | '' | '' | less than 0.01 |
| 90 | '' | 38 | N/2-NCl | '' | '' |
| 91 | '' | 39 | '' | '' | 0.01 |
| 92 | '' | 40 | '' | '' | 0.03 |
| 93 | '' | 41 | '' | '' | 0.01 |
| 94 | '' | 42 | '' | '' | 0.02 |
| 95 | '' | 43 | '' | '' | 0.03 |
| 96 | '' | 45 | '' | '' | '' |
| 97 | '' | 46 | '' | '' | '' |
| 98 | '' | 52 | '' | '' | '' |
| 99 | '' | 53 | '' | '' | 0.02 |
| 100 | '' | 54 | '' | '' | '' |
| 101 | '' | 55 | '' | '' | '' |
| 102 | '' | 56 | '' | '' | 0.01 |
| 103 | '' | 57 | N/10 HCl | '' | 0.01 |
| 104 | '' | 58 | '' | '' | less than 0.01 |
| 105 | '' | 59 | '' | '' | '' |
| 106 | '' | 60 | '' | '' | 0.02 |
| 107 | '' | 61 | '' | '' | 0.02 |
| 108 | '' | 62 | N/2 HCl | '' | less than 0.01 |
| 109 | '' | 63 | '' | '' | 0.03 |
| 110 | '' | 66 | '' | '' | less than 0.01 |
| 111 | '' | 67 | '' | '' | less than 0.01 |

EXAMPLE 112

30 grs. of resinous adsorbent obtained in example 22 were dipped in IN-HCl aqueous solution for 24 hours, rinsed with water to the extent of pH 6 of rinsing water, and packed in glass tube having 15mm diameter.

20 liters of aqueous solution containing $HgCl_2$ at a concentration of 20 ppm corresponding to Hg were passed at pH 6 through the glass tube at a rate of SV=2.

It was found that content of Hg in treated aqueous solution was under detection sensitivity of 0.01 ppm.

EXAMPLE 113

Example 112 was repeated except that resinous adsorbent obtained in example 51 was employed. It was found that content of Hg in treated aqueous solution was under detection sensitivity of 0.01 ppm.

EXAMPLE 114 (in batch process)

Resinous adsorbent obtained in example 1 was ground and 10g, 1g, 0.1g and 0.02g of it were respectively added in Erlenmeyer flasks with 100ml of aqueous solution containing $HgCl_2$ at a concentration of 11.70 ppm corresponding to Hg and each flask was shaken for 20 hours at room temperature. Then resinous adsorbents were filtered off and obtained each filtrate was measured the content of Hg and it was found that mercury adsorption equilibrium concentration were less than 0.005 ppm, less than 0.005 ppm, 0.065 ppm, 2.0 ppm and adsorption equilibrium amount were 0.117 mg/g, 1.17 mg/g, 11.63 mg/g and 48.5 mg/g in that order.

EXAMPLE 115

Resinous adsorbents obtained in example 23 was ground to 50–100 mesh (Tyler) and 0.1 g of adsorbent was added in Erlenmeyer flask with 100 ml of aqueous solution containing $HgCl_2$ at a concentration of 10 ppm corresponding to Hg. The flask was shaked for 20 hours at room temperature and filtrate obtained by filtration of resinous adsorbent was measured the content of Hg and it was found that mercury adsorption equilibrium concentration was 0.08 ppm and adsorption equibibrium amount was 10 mg/g.

EXAMPLE 116

Example 115 was repeated except that resinous adsorbent obtained in example 47 and drainage from electrolysis plant of NaCl by mercury cell, containing about 1ppm of Hg, instead of 10 ppm of $HgCl_2$ aqueous solution, were employed.

Filtrate was measured the content of Hg and it was found that mercury adsorption equilibrium concentration was 0.09 and adsorption equilibrium amount was 0.9 mg/g.

EXAMPLE 117

90 grs. of resinous adsorbent obtained in example 2 were grained to 1–32 mesh (Tyler), dipped in 1N-HCl aqueous solution for 24 hours, rinsed with water to the extent of pH6 of rinsing water, and packed in glass tube having 15mm diameter, 10 liters of aqueous solution containing 10 ppm of phenylmercuric acetate was passed through the glass tube at a rate of SV=4. The content of Hg was less than 0.01 ppm in the treated aqueous solution.

EXAMPLES 118–222

Example 117 was repeated except that resinous adsorbent obtained in example 7, 24, 25, 48 or 65 was employed instead of resinous adsorbent obtained in example 2 and methylmercurychloride (MMC) phenylmercurcuric acetate (PMA) or ethylmercurychloride (EMC) was used instead of 10 ppm aqueous solution of $HgCl_2$. Concentrations of Hg in treated aqueous solution were listed in following Table.

Table

| example | resinous adsorbent obtained in | 10ppm aqueous solution of | SV | concentration of Hg in treated solution |
|---|---|---|---|---|
| 120 | example 7 | MMC | 2 | 0.01 |
| 121 | example 24 | PMA | 2 | 0.02 |
| 122 | example 25 | PMA | 2 | 0.01 |
| 123 | example 48 | EMC | 2 | 0.01 |
| 124 | example 65 | MMC | 2 | 0.02 |

EXAMPLE 123

30 grs. of resinous adsorbent obtained in example 44 was dipped in 1N-HCl aqueous solution for 24 hours, rinsed to the extend of pH=3 of rinsing water and packed in glass tube having 15cm diameter. The layer made of the resine was 30cm in thickness.

10 liter of drainage from electrolysis plant of NaCl by mercury cell, containing about 1 ppm of Hg, was adjusted pH to 3 with hydrochloric acid and, then passed through the glass tube at a rate of SV=2.

The treated drainage contained less than 0.01 ppm of Hg.

EXAMPLES 124–131

Example 123 was repeated that the resinous adsorbent obtained in example 3, 32, 33, 34, 36, 49, 52 or 68 were employed instead of the adsorbent in example 44. Results were listed as follows.

| Example | resinous adsorbent | Hg content (ppm) | SV | concentration of Hg in treated draenage |
|---|---|---|---|---|
| 124 | obtained in example 3 | 1 | 3 | less than 0.01 |
| 125 | " 32 | " | 3 | " |
| 126 | " 33 | " | 3 | 0.01 |
| 127 | " 34 | " | 2 | less than 0.01 |
| 128 | " 36 | " | 2 | " |
| 129 | " 49 | " | 2 | " |
| 130 | " 52 | " | 2 | " |
| 131 | " 68 | " | 2 | " |

EXAMPLE 132

30 grs. of resinous adsorbent obtained in example 44 were grained to 14–32 mesh (Tyler), dipped in 1N-NCl aqueous solution for 24 hours, rinsed with water to the extent of pH=4 of rinsing water, and packed in glass tube having 15mm diameter at a thickness of 30cm.

10 liter of aqueous solution containing respectively Hg, Pb, Cd, Ni, Mn, Cr, B, Co, Cu, As, Al at concentrations of 20 ppm was adjusted pH 4 and passed at a rate of SV=2 through the glass tube and treated aqueous solution was measured the content of each metallic component by emission spectroanalysis method and it was found that contents of Hg and Cu were under detection sensitivity (Hg : 0.001 ppm, Cu 0.5 ppm) and content of other metals of Pb, Cd, Ni, Mn, Cr, B, Co, As and Al were about 18~20 ppm and consequently the resinous adsorbent had a selectivity for murcury and copper.

EXAMPLE 133

Example 132 was repeated except that resinous adsorbent obtained in Example 4, 5, 6, 31, 35, 50, 64, or 69 was employed instead of the absorbent obtained in example 44.

Resinous adsorbents obtained in example 4, 5 and 35 showed selectivities for murcury and copper and Resinous adsorbens obtained in example 6, 31, 50, 64 and 69 showed for murcury and lead.

EXAMPLE 134

Removal For Free Chlorine 9 grs. of foamed substance obtained in example 23 were packed in glass tube having inside diameter of 15mm. The thickness of the layer was 30cm length. Water containing 100 ppm of free chlorine was passed through the glass tube at a rate of SV=8. After the treatment, the content of free chlorine was measured and identified less than 0.1 ppm by colorimetric analysis of orthotolidine method.

The treatment was repeated for service water containing 0.4 ppm of chlorine except the rate of SV=15. The content of chlorine in the treated water was less than 0.1 ppm.

EXAMPLE 135

9 grs. of urethane foam in a market was packed in 30cm thickness in glass tube having 15mm diameter.

Service water containing 0.4 ppm was passed through the layer and content of chlorine was identified less than 0.1 ppm by colorimetric analysis of orthotolidine.

EXAMPLE 136

9 grs. of foamed substance obtained in example 23 was packed in 30cm thickness in glass tube having 15mm diameter and than drainage containing mercury compounds corresponding to 3.5 ppm of mercury from an electrolysis plant of NaCl by mercury cell was passed through the layer at a rate SV=7. The content of free chlorine in the treated drainage was less than 0.1 ppm by colorimetric anolysis by orthalidine method.

EXAMPLE 137

Solidifying Compoment For Packing Harmful Heavy Metallic Component

Resinous adsorbent obtained in example 51 (50–150 mesh) 25 parts and Portland cement 100 parts were mixed and solidifying component for mercury compound were obtained.

EXAMPLE 138

Resinous adsorbent obtained in example 44 (50–150 mesh) 0.5 parts and aluminacement 100 parts were mixed and solidifying component for mercury component were obtained.

EXAMPLE 139

Example 137 was repeated for the resious adsorbent obtained in example 1, 2 or 69.

EXAMPLE 140

Resinous adsorbent obtained in example 44 (under 100 mesh) 20 parts, liquid epoxide resin 100 parts were mixed and solidifying components for mercury component were obtained.

EXAMPLE 141

Solidifying component, cement, water and mercury mude containing 50 ppm mercury component corresponding to mercury, which was by-produced in a step of refining electrolyte of NaCl in mercury cell electrolysis method, were mixed and filled up in a mould and about 120 grs. of cement blocks having 40mm × 40mm × 40mm were obtained.

After 28 days from the moulding the blocks were measured the strength (kg/m$^2$), and dipt in 400ml of distilled water and then measured the exuding murcury after 1 day, 14 days, 30 days and 365 days from the dipping by using 50 ml from total distilled water and not replenishing distilled water.

Resinous adsorbent, cement, water used and strength, concentration of mercury exuded in water were listed in Table A.

Note: The mude contained 8% of NaCl, 7% of Mg(OH)$_2$, 14% of CaSO$_4$:2H$_2$O, 27% of CaCO$_3$, 11% of C.

Table A

| Run | solidifying component | | | | | strength after 28 days (Kg/cm$^2$) | concentration of mercury exuded in water (ppm) exuding period | | | |
|---|---|---|---|---|---|---|---|---|---|---|
| | resinous adsorbent (A) | cement (B) | rate by weight (A):(B) | water | mude | | 1 day | 14 days | 30 days | 365 days |
| 1 | obtained in example 1 | Portland | 2:100 | 50 | 100 | 108 | less than 0.005 | 0.005 | less than 0.005 | less than 0.005 |
| 2 | " 10 | Alumina | 10:100 | 50 | 100 | 103 | " | 0.012 | 0.007 | " |
| 3 | " 21 | Portland | 10:100 | 50 | 100 | 98 | " | 0.025 | 0.013 | " |
| 4 | " 5 | " | 10:100 | 50 | 100 | 101 | " | 0.005 | less than 0.005 | " |
| 5 | " 6 | " | 10:100 | 50 | 100 | 95 | " | 0.015 | 0.008 | " |
| 6 | " 22 | " | 5:100 | 50 | 100 | 98 | " | less than 0.005 | less than 0.005 | " |
| 7 | " 25 | " | 5:100 | 70 | 200 | 55 | " | " | " | " |
| 8 | " 26 | " | 10:100 | 50 | 100 | 105 | " | 0.018 | 0.010 | " |
| 9 | " 27 | " | 10:100 | 70 | 200 | 53 | " | 0.013 | 0.008 | " |

Table A-continued

| Run | solidifying component resinous adsorbent (A) | cement (B) | rate by weight (A):(B) | water | mude | strength after 28 days (Kg/cm²) | concentration of mercury exuded in water (ppm) exuding period 1 day | 14 days | 30 days | 365 days |
|---|---|---|---|---|---|---|---|---|---|---|
| 10 | '' | 20 | '' | 10:100 | 50 | 100 | 101 | '' | 0.035 | 0.018 | 0.009 |
| 11 | '' | 11 | '' | 10:100 | 50 | 100 | 97 | '' | 0.042 | 0.023 | 0.006 |
| 12 | '' | 28 | '' | 10:100 | 50 | 100 | 107 | '' | 0.021 | 0.011 | less than 0.005 |
| 13 | '' | 29 | '' | 5:100 | 70 | 200 | 59 | '' | less than 0.005 | less than 0.005 | '' |
| 14 | '' | 30 | '' | 10:100 | 50 | 100 | 102 | '' | '' | '' | '' |
| 15 | '' | 54* | '' | 10:100 | 50 | 100 | 104 | '' | 0.008 | '' | '' |
| 16 | '' | 44* | '' | 2:100 | 50 | 100 | 94 | '' | less than 0.005 | '' | '' |
| 17 | '' | 47* | '' | 5:100 | 50 | 100 | 106 | '' | '' | '' | '' |
| 18 | '' | 52* | '' | 1:100 | 50 | 100 | 108 | '' | '' | '' | '' |
| 19 | '' | 49* | '' | 2:100 | 70 | 200 | 61 | '' | '' | '' | '' |
| control | non | | '' | 0:100 | 50 | 100 | 110 | 0.006 | 0.115 | 0.068 | 0.018 |

*carrier of diatom earth was used.

EXAMPLE 142

Each solidifying components obtained in example 137 or 138 was mixed with mercury mude as shown in Table E at a rate of 1 : 1 or 1 : 8 and the mixture was filled up in a mould and about 120 grs of cement blocks having 40mm × 40mm × 40mm were obtained. Test was carried out according to Table D. The results were shown in Table B.

EXAMPLE 143

100 parts of solidifying component obtained in example 140 was mixed with 12 parts of mercury mude as shown in example 141 and then 10 parts of hardener was mixed and cured in moulding 40mm × 40mm × 40mm. Test for exuding was carried out according to example 141.

The results were shown in table C.

Table B

| solidifying component | solidifying component mude (by weight) | water (%) | strength after 28 days from moulding | exuding water | concentration of mercury exuding in water (ppm) exuding period 1 day | 14 days | 30 days | 365 days |
|---|---|---|---|---|---|---|---|---|
| example 137 | 1/1 | 60 | 105 | distilled water | less than 0.005 | less than 0.005 | less than 0.005 | less than 0.005 |
| | | 60 | 103 | sea water* | '' | '' | '' | '' |
| | 1/8 | 30 | 19 | distilled water* | '' | '' | '' | '' |
| | | 30 | 19 | sea water* | '' | '' | '' | '' |
| example 138 | 1/1 | 50 | 116 | distilled water | '' | '' | '' | '' |
| | | 30 | 109 | sea water* | '' | '' | '' | '' |
| | 1/8 | 30 | 20 | distilled water | '' | 0.015 | 0.008 | '' |
| | | 30 | 23 | sea water* | '' | 0.009 | 0.005 | '' |
| control | 1/1 | 50 | 115 | distilled water | 0.015 | 0.052 | 0.058 | 0.048 |
| | | | 110 | sea water* | 0.027 | 0.073 | 0.056 | 0.060 |
| | 1/8 | 30 | 22 | distilled water | 0.021 | 0.089 | 0.101 | 0.095 |
| | | | 25 | sea water* | 0.052 | 0.150 | 0.168 | 0.148 |

*sea water was used as a exuding water table C

| solidifying component | solidifying component mude (by weight) | exuding water | concentration of mercury exuding in water (ppm) exuding period | | | |
|---|---|---|---|---|---|---|
| | | | 1 day | 14 days | 30 days | 365 days |
| example 140 | 12/100 | distilled water | less than 0.005 | less than 0.005 | less than 0.005 | less than 0.005 |
| | | sea water | '' | '' | '' | '' |
| (control) liquid eporide resin in market with hardner | 22/100 | distilled water | 0.022 | 0.055 | 0.050 | 0.050 |
| | | sea water | 0.010 | 0.019 | 0.019 | 0.017 |

EXAMPLE

Resinous adsorbent, cement water, and sludge containing copper, which were by-produced in plating plant, were mixed and cement blockshaving 40mm × 40mm × 40mm were obtained. Test was carried on according to example 140.

Resinous adsorbent, cement, water, strength, and result of exuding test were listed in Table D.

EXAMPLE 144

Example 142 was repeated for cindered mude, which was obtained by firing mercury mude at about 500°C–700°C for the purpose of recovery of mercury, instead of Mercury mude.

The results of the test were listed in Table E.

Table D

| | solidifying component | | | | | strength 28 days after moulding (Kg/cm²) | | concentration of copper exuded in water (ppm) exuding period | | | |
|---|---|---|---|---|---|---|---|---|---|---|---|
| run | resinous adsorbent (A) | cement (B) | rate by weight (A):(B) | water | sludge | | exuding water | 1 day | 14 days | 30 days | 365 days |
| 1 | obtained in example 5 | Portland | 10:100 | 50 | 100 | 101 | distilled water | less than 0.01 | less than 0.01 | less than 0.01 | less than 0.01 |
| 2 | '' 5 | '' | 10:100 | 50 | 100 | 97 | sea water | '' | '' | '' | '' |
| 3 | '' 30 | '' | 10:100 | 50 | 100 | 96 | distilled water | '' | '' | '' | '' |
| 4 | '' 30 | '' | 10:100 | 50 | 100 | 103 | sea water | '' | '' | '' | '' |
| 5 | '' 49 | '' | 5:100 | 70 | 200 | 58 | distilled water | '' | '' | '' | '' |
| 6 | '' 49 | '' | 5:100 | 70 | 200 | 63 | sea water | '' | '' | '' | '' |
| control 7 | not added | '' | 0:100 | 50 | 100 | 115 | distilled water | 0.015 | 0.052 | 0.058 | 0.048 |
| 8 | not added | '' | 0:100 | 50 | 100 | 110 | sea water | 0.027 | 0.073 | 0.056 | 0.060 |
| 9 | not added | '' | 0:100 | 70 | 200 | 71 | distilled water | 0.019 | 0.055 | 0.051 | 0.053 |
| 10 | not added | '' | 0:100 | 70 | 200 | 73 | sea water | 0.033 | 0.081 | 0.085 | 0.077 |

Table E

| solidifying component | solidifying component cinder (by weight) | water (%) | exuding water | strength after 28 days from moulding (Kg/cm²) | concentration of mercury exuding in water (ppm) exuding period | | | |
|---|---|---|---|---|---|---|---|---|
| | | | | | 1 day | 14 days | 30 days | 365 days |
| example 137 | 1/8 | 35 | distilled water | 28 | less than 0.005 | less than 0.005 | less than 0.005 | less than 0.005 |
| | | 35 | sea water | 27 | '' | '' | '' | '' |
| example 138 | 1/1 | 70 | distilled water | 131 | '' | '' | '' | '' |
| | | 70 | sea water | 127 | '' | '' | '' | '' |
| | 1/1 | 70 | distilled water | 135 | '' | 0.005 | 0.005 | 0.005 |
| cement (control) | 1/8 | 35 | distilled water | 30 | '' | 0.008 | 0.008 | 0.006 |

EXAMPLE 145

100 parts of solodifying component obtained example 137 or 138, 100 parts of sand and 30 parts of water were mixed and mortal plaster was obtained.

On the other hand, 100 part of mercury mude 100 part of Portland coment 50 parts of water were mixed, filled up in a mould and a cement block of 4cm × 4cm × 4cm was obtained and them the block was covered with mortal plaster in thickness on 1cm.

Exuding test with water was repeated as shown in example 141. After 365 days, less than 0.005 ppm of concentration of mercury exuded was found.

We claim:

1. An adsorbent for chlorine, heavy metals or heavy metallic compounds, which comprises a resin prepared by reacting polyisocyanate with at least one compound selected from the group consisting of polyols and functional monomers which have at least 2 active hydrogen atoms and at least one functional group selected from the radical group consisting of

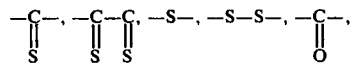

> NH and —N=, in a ratio of a total active hydrogen atom number in the polyol and functional monomer to a total isocyanate group number in the polyisocyanate of about 0.8 to about 5.0, said functional monomer being a compound selected from the group consisting of thiourea, urea, rubeanic acid, diphenylthiourea, dithiodiglycollic acid, and said polyisocyanate being a compound selected from the group consisting of toluylenediisocyanate (TDI), dimer or trimer of TDI, diphenylmethandiisocyanate (MDI) and TDI or MDI tar.

* * * * *